Sept. 9, 1924.  
J. H. PRESS  
VEHICLE BODY  
Filed Oct. 4, 1920
1,508,122
2 Sheets-Sheet 1
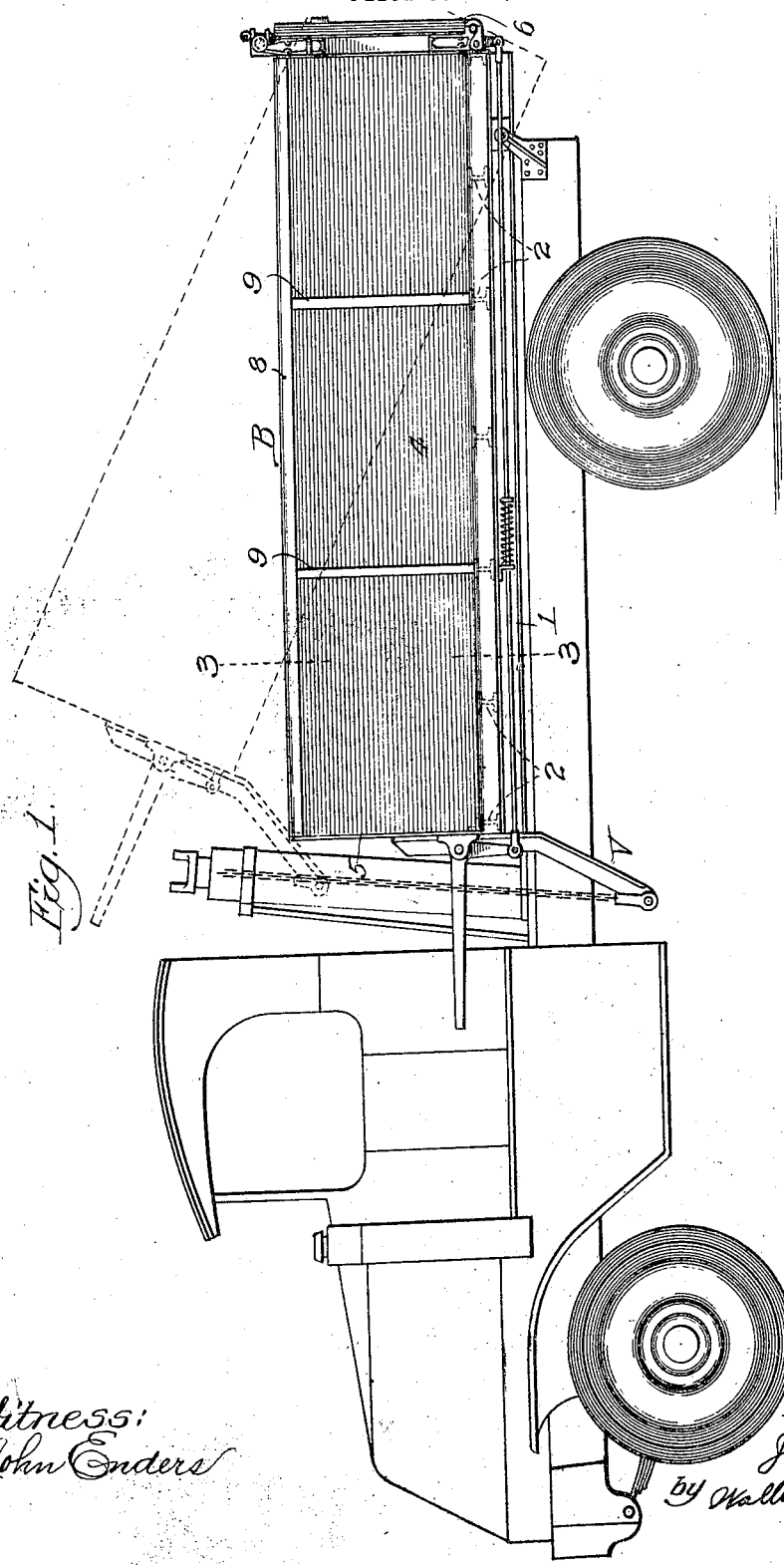

Sept. 9, 1924.  
J. H. PRESS  
VEHICLE BODY  
Filed Oct. 4, 1920  
1,508,122  
2 Sheets-Sheet 2
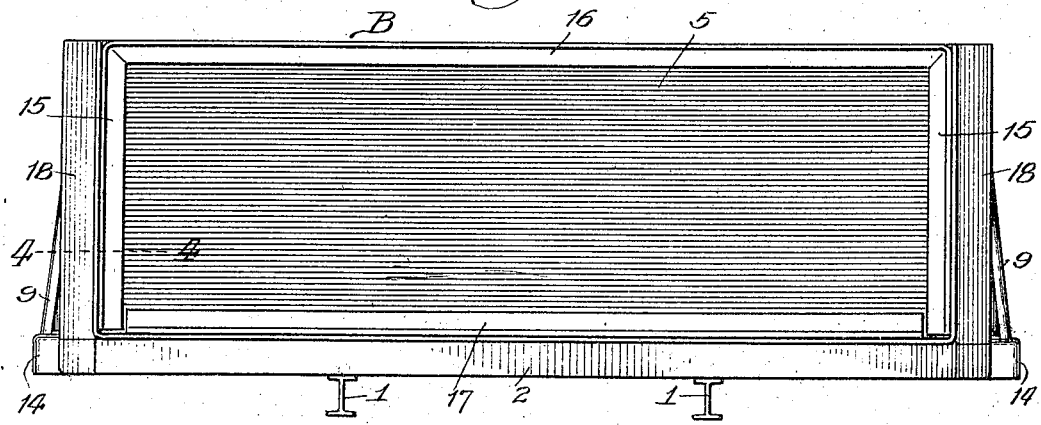
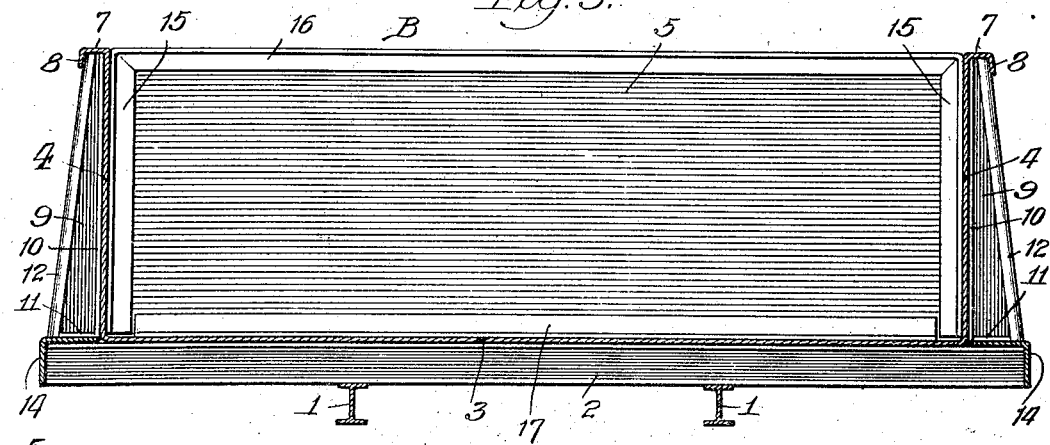
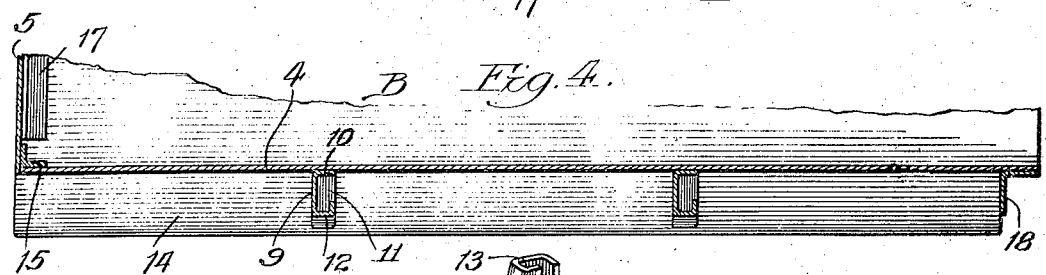
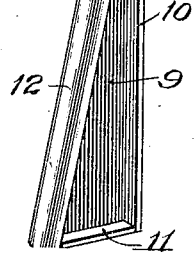
Witness:
John Enders
Inventor:
Jacob H. Press,
by Wallace R. Lane
Atty.

Patented Sept. 9, 1924.

1,508,122

UNITED STATES PATENT OFFICE.

JACOB H. PRESS, OF CHICAGO, ILLINOIS, ASSIGNOR TO JACOB PRESS SONS, OF CHICAGO, ILLINOIS.

VEHICLE BODY.

REISSUED

Application filed October 4, 1920. Serial No. 414,572.

*To all whom it may concern:*

Be it known that I, JACOB H. PRESS, a citizen of the United States, residing in the city of Chicago, county of Cook, and State of Illinois, have invented certain new and useful Improvements in Vehicle Bodies, of which the following is a specification.

This invention relates to vehicle bodies and more particularly to such as are adapted for use with heavy duty vehicles, such as automobile trucks.

The purpose of my invention is to improve in various ways upon the structure of vehicle bodies, making them more sturdy and durable; and such further objects, advantages and capabilities as will later more fully appear.

My invention further resides in the combination, construction, and arrangement of parts illustrated in the accompanying drawings, and while I have shown therein a preferred embodiment, I desire the same to be understood as illustrative only, and not as limiting my invention.

In the accompanying drawings illustrating my invention:

Fig. 1 is a side elevation of an automobile truck showing my invention as applied thereto.

Fig. 2 is a rear end elevation of the vehicle body shown in Fig. 1, the endgate and its supports being omitted.

Fig. 3 is a cross-section thereof substantially along the line 3—3 Fig. 1.

Fig. 4 is a fragmentary longitudinal sectional plan, substantially along the plane indicated by the line 4—4, Fig. 2, and Fig. 5 is a perspective view of one of the stays used at the sides to stay same against lateral pressure on the sides of the body.

Referring more in detail to the drawings, V denotes the vehicle and B the body, the latter constituting the subject-matter of this present application. The body B comprises longitudinal I-beams 1 adapted to rest upon the frame of the truck, or other vehicle V, transverse I-beams 2 resting upon and secured to the longitudinal beams 1, and themselves adapted to support the box of the body B. This box comprises a bottom, or bed 3 formed integrally with sidewalls 4 and having a front endgate 5 and a rear endgate 6. This body is formed by bending the sheet metal along substantially parallel lines so that there are formed the two upstanding walls 4, provided at their upper edges with flanges 7 having their edges downturned to form troughs or recesses and a protecting member, which is also adapted to assist in holding the upper end of the stay members 9 and the box, or body B, in proper relation.

To form the stay 9 a piece of sheet metal is cut out with its ends substantially parallel and one edge at substantially a right-angle thereto, the remaining edge making an acute angle with one end and an obtuse angle with the other, so that the piece of metal is wider at one end than the other. The edge of the sheet metal which is at a right-angle to the two ends is bent laterally in a position substantially perpendicular to the body of the stay, forming a flange 10. The wide end is also bent into a position substantially perpendicular to the body portion to form the flange 11, and the other longitudinal edge is bent along two lines substantially parallel to form a trough shaped portion or channel flange 12. This forms a very rigid stay member with a minimum of labor and materials and when the narrow end 13 of the stay is inserted under the flange 7, between wall 4 and the edge portion 8, and the flange 11 and bottom 3 are secured in position, the structure is very rigid.

The ends of the transverse beams 2 project laterally beyond the sides of the body B, and are covered by angular plates 14 which extend from the lateral edges of the bottom 3 outwardly and downwardly, as shown in Fig. 3.

An angle iron is bent to form a horizontal portion 16 and vertical arms 15, and when the structure is placed in position as shown in Figs. 3 and 4, and secured to the walls 4 and endgate 5 the latter is considerably reinforced and rigidly held in position. Secured to the bottom 3 and the bottom edge of the endgate 5 is an angle iron 17, which assists in strengthening the structure and holding the parts in assembled relation, even under the great strains incident to the use of such a structure. At the rear corners are located laterally and rearwardly opening angle irons 18 adapted to stay the rear corners of the box and to accommodate the supporting members for the endgate 6, the structure of which it is unnecessary to describe in the present application, as no claim is made herein to the novelty of this construction, the same being described and claimed in a co-pending application assigned to Jacob Press Sons.

It is, of course, understood that the specific description of structure set forth above may be departed from without departing from the spirit of my invention as set forth in this specification and the appended claims.

Having now described my invention, I claim:—

1. In a structure of the character stated, longitudinal supports, transverse supports resting thereon, a box structure resting on and secured to the transverse supports, a cover-plate along the sides of the box, resting on and secured to the transverse supports and bracing posts secured to the cover-plate external to the box and adapted to brace the sides of same against lateral forces, the upper edges of the sides of the box being turned over to form inverted troughs, and the upper ends of the bracing posts fitting snugly within these troughs to assist in furnishing a rigid brace for the sides of the box.

2. In a vehicle body, a stay member, comprising a substantially flat body portion having one end bent inwardly at substantially a right angle thereto, a longitudinal margin bent at substantially a right angle to the body portion and to the end, and at its other longitudinal margin bent into trough shape to reinforce the stay member, the finished stay being wider at the bottom than at the top.

3. A vehicle body, comprising transverse beams, longitudinal beams supporting the transverse beams, a box resting on the transverse beams, a cover-plate resting on and extending around the ends of the transverse beams, and staying posts secured to and upstanding from the cover plate to brace the sides of the box, the top edges of the latter being bent outwardly and downwardly to closely engage the upper ends of the posts to increase the lateral force resisting power of the box and posts.

4. In a vehicle body, a container having bottom, side and end walls, a supporting frame, upwardly extending stays on said frame, said side walls having upper reversed flanges providing recesses between the flanges and the side walls for receiving the upper ends of said stays, said stays being of greater width at the bottom than the top to form a rigid brace against lateral thrusts upon the sides of the container and each provided along one edge with a channel flange.

5. In a vehicle body, an open top metallic container having an upper rim extending outwardly a substantial distance and then downwardly providing a longitudinal recess therein, a supporting frame, upright metallic stays on said frame and having their upper ends received in said recesses, said stays being wider at the bottom than the top and provided with marginal flanges, to form a rigid brace for the sides of said container against lateral thrust from the inside.

In witness whereof, I hereunto subscribe my name to this specification.

JACOB H. PRESS.